(12) United States Patent
Tan

(10) Patent No.: US 8,843,407 B2
(45) Date of Patent: Sep. 23, 2014

(54) METHOD AND SYSTEM FOR MULTIUSE REDEMPTION CARDS

(75) Inventor: Edwin Tan, Sunnyvale, CA (US)

(73) Assignee: Sky Castle Global Limited, Tortola (VG)

( * ) Notice: Subject to any disclaimer, the term of this patent is extended or adjusted under 35 U.S.C. 154(b) by 0 days.

(21) Appl. No.: 13/346,661

(22) Filed: Jan. 9, 2012

(65) Prior Publication Data

US 2012/0116966 A1     May 10, 2012

Related U.S. Application Data

(63) Continuation of application No. 12/628,040, filed on Nov. 30, 2009, and a continuation of application No. 12/134,149, filed on Jun. 5, 2008, now Pat. No. 7,792,751.

(51) Int. Cl.
*G06Q 40/00* (2012.01)
*G06Q 30/00* (2012.01)
*G06Q 20/20* (2012.01)
*G06Q 20/34* (2012.01)
*G06Q 20/10* (2012.01)
*G06Q 20/28* (2012.01)

(52) U.S. Cl.
CPC ............... *G06Q 20/28* (2013.01); *G06Q 30/00* (2013.01); *G06Q 40/00* (2013.01); *G06Q 20/20* (2013.01); *G06Q 20/348* (2013.01); *G06Q 20/105* (2013.01)
USPC .......................................................... 705/35

(58) Field of Classification Search
CPC ........ G06Q 40/00; G06Q 20/29; G06Q 20/22
USPC ...................... 705/1–99; 235/1–50; 709/1–90
See application file for complete search history.

(56) References Cited

U.S. PATENT DOCUMENTS

| | | | |
|---|---|---|---|
| 6,138,106 | A | 10/2000 | Walker |
| 6,375,073 | B1 | 4/2002 | Aebi et al. |
| 6,782,080 | B2 | 8/2004 | Leivo et al. |
| 7,000,028 | B1 | 2/2006 | Broadhurst et al. |
| 7,003,500 | B1 | 2/2006 | Driessen |
| 7,246,046 | B2 | 7/2007 | Coakley |
| 7,295,658 | B2 | 11/2007 | Moon et al. |
| 7,337,947 | B1 | 3/2008 | Swanson, Sr. |
| 7,440,922 | B1 | 10/2008 | Kempkes et al. |

(Continued)

FOREIGN PATENT DOCUMENTS

| | | |
|---|---|---|
| CN | 102113002 A | 6/2011 |
| CN | 102113008 A | 6/2011 |

(Continued)

OTHER PUBLICATIONS

Mark Furletti, Prepaid Card Markets & Regulation, Feb. 2004, Federal Reserve Bank of Philadelphia, pp. 1-19.*

(Continued)

*Primary Examiner* — Marissa Liu
(74) *Attorney, Agent, or Firm* — Perkins Coie LLP

(57) ABSTRACT

A multiuse redemption card enables a purchaser to provide the multiuse redemption card to a recipient for a defined amount and delay payment until the recipient uses the redemption card. The delayed payment can be incremental up to the defined amount so that the recipient can use the card multiple times.

11 Claims, 7 Drawing Sheets

(56) References Cited

U.S. PATENT DOCUMENTS

| | | |
|---|---|---|
| 7,697,920 B1 | 4/2010 | McClain |
| 7,792,751 B2 | 9/2010 | Tan |
| 8,406,392 B2 | 3/2013 | Tan |
| 8,504,395 B2 | 8/2013 | Vago et al. |
| 2001/0042784 A1 | 11/2001 | Fite et al. |
| 2002/0046341 A1 | 4/2002 | Kazaks et al. |
| 2002/0091541 A1 | 7/2002 | Lundberg |
| 2002/0091649 A1 | 7/2002 | Anvekar et al. |
| 2002/0095390 A1 | 7/2002 | Hovsepian |
| 2002/0190123 A1 | 12/2002 | Anvekar et al. |
| 2003/0004828 A1 | 1/2003 | Epstein |
| 2003/0033246 A1 | 2/2003 | Slater |
| 2003/0069974 A1 | 4/2003 | Lu et al. |
| 2003/0104174 A1 | 6/2003 | Itakura et al. |
| 2003/0128827 A1 | 7/2003 | Khan |
| 2003/0144935 A1 | 7/2003 | Sobek |
| 2003/0154179 A1 | 8/2003 | Mercer |
| 2003/0208624 A1 | 11/2003 | Grossman |
| 2004/0007618 A1* | 1/2004 | Oram et al. ............... 235/380 |
| 2004/0088250 A1 | 5/2004 | Bartter et al. |
| 2004/0139318 A1 | 7/2004 | Fiala et al. |
| 2004/0181453 A1 | 9/2004 | Ray et al. |
| 2004/0193490 A1 | 9/2004 | Pletz |
| 2004/0260607 A1 | 12/2004 | Robbins et al. |
| 2005/0157801 A1 | 7/2005 | Gore |
| 2005/0199706 A1 | 9/2005 | Beck et al. |
| 2006/0116891 A1 | 6/2006 | Muller et al. |
| 2006/0129501 A1 | 6/2006 | Pastusiak et al. |
| 2006/0138215 A1 | 6/2006 | Pallares |
| 2006/0161879 A1 | 7/2006 | Lubrecht et al. |
| 2006/0190275 A1 | 8/2006 | Dupree et al. |
| 2006/0212925 A1 | 9/2006 | Shull et al. |
| 2006/0213984 A1 | 9/2006 | Walker |
| 2006/0233269 A1 | 10/2006 | Bhushan et al. |
| 2006/0261154 A1* | 11/2006 | Arthur et al. ............ 235/380 |
| 2006/0293963 A1* | 12/2006 | Hoblit ..................... 705/15 |
| 2007/0094129 A1 | 4/2007 | Graves et al. |
| 2007/0100707 A1 | 5/2007 | Driessen et al. |
| 2007/0110127 A1 | 5/2007 | Mergen |
| 2007/0112655 A1 | 5/2007 | Jones |
| 2007/0118478 A1 | 5/2007 | Graves |
| 2007/0208869 A1 | 9/2007 | Adelman et al. |
| 2007/0250920 A1 | 10/2007 | Lindsay |
| 2007/0272743 A1 | 11/2007 | Christie et al. |
| 2007/0288326 A1 | 12/2007 | Boldin |
| 2008/0022375 A1 | 1/2008 | Stanley |
| 2008/0041938 A1 | 2/2008 | Wise |
| 2008/0059485 A1 | 3/2008 | Finn |
| 2008/0065611 A1 | 3/2008 | Hepworth et al. |
| 2008/0070548 A1* | 3/2008 | Cha et al. ............... 455/411 |
| 2008/0270282 A1 | 10/2008 | Colucci-Zieger |
| 2008/0319908 A1 | 12/2008 | Venkatachalam et al. |
| 2009/0013396 A1 | 1/2009 | Rajunas, III |
| 2009/0132424 A1 | 5/2009 | Kendrick et al. |
| 2009/0138466 A1 | 5/2009 | Henry et al. |
| 2009/0192928 A1 | 7/2009 | Abifaker |
| 2009/0299731 A1 | 12/2009 | Owen |
| 2011/0225019 A1 | 9/2011 | Taylor et al. |
| 2012/0323804 A1 | 12/2012 | Lee |

FOREIGN PATENT DOCUMENTS

| | | |
|---|---|---|
| EP | 1531416 | 5/2005 |
| KR | 20000035847 A | 6/2000 |
| KR | 20010084957 | 9/2001 |
| KR | 20030013074 | 2/2003 |
| KR | 20030091077 A | 12/2003 |
| KR | 20040075191 A | 8/2004 |
| KR | 20080028686 | 4/2008 |
| WO | WO-0111443 A2 | 2/2001 |
| WO | WO-2007086068 A2 | 8/2007 |
| WO | WO-2009148503 A2 | 12/2009 |
| WO | WO-2009149080 A2 | 12/2009 |
| WO | WO-2010019348 A2 | 2/2010 |
| WO | WO-2011066173 A2 | 6/2011 |

OTHER PUBLICATIONS

Co-pending U.S. Appl. No. 11/903,227, filed Sep. 20, 2007.
Co-pending U.S. Appl. No. 12/134,149, filed Jun. 5, 2008.
Co-pending U.S. Appl. No. 12/191,161, filed Aug. 13, 2008.
Co-pending U.S. Appl. No. 12/628,040, filed Nov. 30, 2009.
Co-pending U.S. Appl. No. 12/992,256, filed Dec. 15, 2010.
Co-pending U.S. Appl. No. 61/057,741, filed May 30, 2008.
Co-pending U.S. Appl. No. 61/419,128, filed Dec. 2, 2010.
Co-pending U.S. Appl. No. 61/472,215, filed Apr. 6, 2011.
Craigslist Rolls Out New "Phone Verification Policy"; The e Sale Guys, http://esalesguys.blogspot.com/2008/02/craigslist-rolls-out-new-phone, Sep. 30, 2009; pp. 1-3.
International Search Report PCT/US2008/010044 dated Mar. 24, 2009, pp. 1-2.
International Search Report PCT/US2009/051011 dated Feb. 17, 2010, pp. 1-3.
Notice of Allowance Mailed Jan. 13, 2010 in Co-pending U.S. Appl. No. 12/134,149, filed Jun. 5, 2008.
Final Office Action Mailed Aug. 20, 2009 in Co-pending U.S. Appl. No. 12/134,149, filed Jun. 5, 2008.
Final Office Action Mailed Sep. 13, 2011 in Co-pending U.S. Appl. No. 11/903,227, filed Sep. 20, 2007.
International Search Report PCT/US2009/003101 dated Dec. 30, 2009.
International Search Report PCT/US2010/057290 dated Jun. 21, 2011, pp. 1-3.
International Search Report PCT/US2009/045965 dated Jan. 14, 2010.
Non-Final Office Action Mailed Mar. 12, 2009 in Co-pending U.S. Appl. No. 12/134,149, filed Jun. 5, 2008.
Non-Final Office Action Mailed Jan. 4, 2011 in Co-pending U.S. Appl. No. 12/628,040, filed Nov. 30, 2009.
Non-Final Office Action Mailed Mar. 21, 2011 in Co-pending U.S. Appl. No. 11/903,227, filed Sep. 20, 2007.
Non-Final Office Action Mailed Nov. 9, 2011 in Co-pending U.S. Appl. No. 12/628,040, filed Nov. 30, 2009.
Notice of Allowance Mailed Jul. 26, 2010 in Co-pending U.S. Appl. No. 12/134,149, filed Jun. 5, 2008.
Restriction Requirement Mailed Feb. 2, 2011 in Co-pending U.S. Appl. No. 11/903,227, filed Sep. 20, 2007.
Restriction Requirement Mailed Aug. 23, 2011 in Co-pending U.S. Appl. No. 12/628,040, filed Nov. 30, 2009.
Restriction Requirement Mailed Nov. 9, 2011 in Co-pending U.S. Appl. No. 12/628,040, filed Nov. 30, 2009.
Written Opinion PCT/US2009/045965 dated Jan. 14, 2010; pp. 1-4.
Written Opinion PCT/US2009/051011 dated Feb. 17, 2010, pp. 1-5.
Written Opinion PCT/US2008/010044 dated Mar. 24, 2009; pp. 1-2.
Written Opinion PCT/US2009/003101 dated Dec. 30 2009; pp. 1-3.
Written Opinion PCT/US2009/057290 dated Jun. 21, 2011; pp. 1-4.
English Translation of CN-102113008-A, filed Jun. 29, 2011 by Sky Castle Global Ltd.
English Translation of CN-102113002-A, filed Jun. 29, 2011 by Sky Castle Global Ltd.
Extended European Search Report with Supplementary European Search Report and European Search Opinion EP 09759240.6 dated Jan. 23, 2012, pp. 1-8.
Office Action Mailed Feb. 24, 2012, in Chinese Patent Application No. 200980130784.7. pp. 1-3.
Office Action Mailed Dec. 1, 2011, in Chinese Patent Application No. 200980130786.6, pp. 1-4.
Co-pending U.S. Appl. No. 13/310,557, filed Dec. 2, 2011.
Final Office Action Mailed Nov. 7, 2011 in Co-pending U.S. Appl. No. 12/628,040, filed Nov. 30, 2009.
Advisory Action Mailed Apr. 3, 2012 in U.S. Appl. No. 12/628,040, filed Nov. 30, 2009.
Restriction Requirement Mailed May 14, 2012 in Co-pending U.S. Appl. No. 13/346,661, filed Jan. 9, 2012.

(56) References Cited

OTHER PUBLICATIONS

Non-Final Office Action Mailed Mar. 29, 2012, in U.S. Appl. No. 12/191,161, filed Aug. 13, 2008.
Co-pending U.S. Appl. No. 13/830,450 by Tan, E., et al. filed Mar. 14, 2013.
Co-pending U.S. Appl. No. 13/830,655, by Tan, E., et al. filed Mar. 14, 2013.
U.S. Appl. No. 13/850,049 by Tan, E., filed Mar. 25, 2013, now abandoned.
Non-Final Office Action mailed Sep. 6, 2013, in Co-pending U.S. Appl. No. 12/992,256 by Tan, E., filed Dec. 15, 2010.
Non-Final Office Action Mailed Jul. 16, 2012, in Co-pending U.S. Appl. No. 13/346,661 by Tan, E., filed Jan. 9, 2012.
Final Office Action Mailed Jan. 21, 2013, in Co-pending U.S. Appl. No. 13/346,661 by Tan, E., filed Jan. 9, 2012.
Non-Final Office Action Mailed Oct. 16, 2012, in U.S. Appl. No. 12/191,161 by Tan, E., filed Aug. 13, 2008.
Notice of Allowance Mailed Nov. 16, 2012, in U.S. Appl. No. 12/191,161 by Tan, E., filed Aug. 13, 2008.
Restriction Requirement mailed Aug. 15, 2013, in Co-pending U.S. Appl. No. 13/310,557 by Tan, E., et al. filed Dec. 2, 2011.
Non-Final Office Action mailed Sep. 13, 2013, in Co-pending U.S. Appl. No. 13/310,557 by Tan. E., et al. filed Dec. 2, 2011.
Non-Final Office Action mailed Aug. 21, 2013, in Co-pending U.S. Appl. No. 13/830,450 by Tan, E., et al. filed Mar. 14, 2013.
Restriction Requirement mailed Aug. 16, 2013, in Co-pending U.S. Appl. No. 13/830,655, by Tan, E., et al. filed Mar. 14, 2013.
Non-Final Office Action mailed Oct. 17, 2013, in Co-pending U.S. Appl. No. 13/830,655, by Tan, E., et al. filed Mar. 14, 2013.

* cited by examiner

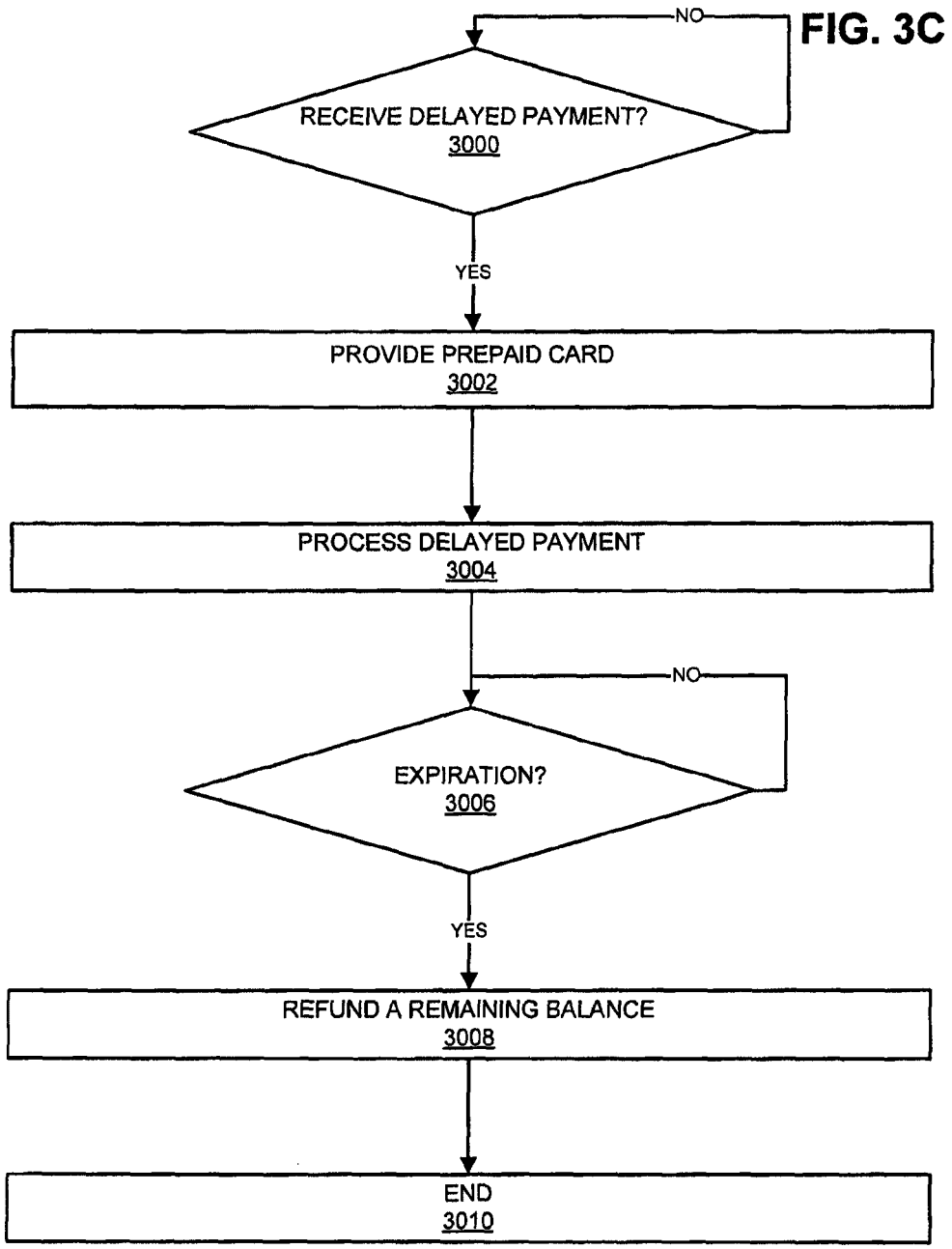

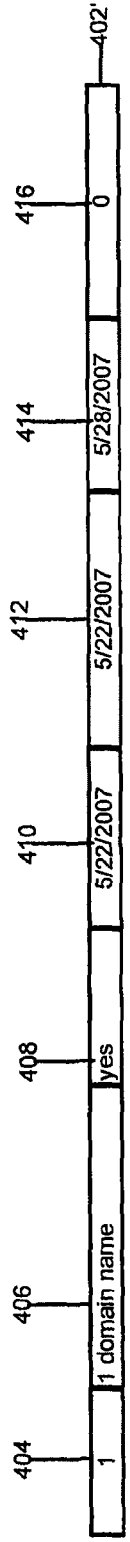

METHOD AND SYSTEM FOR MULTIUSE REDEMPTION CARDS

CROSS REFERENCE TO RELATED APPLICATIONS

This application is a continuation application of U.S. patent application Ser. No. 12/628,040 entitled "METHOD AND SYSTEM FOR DELAYED PAYMENT OF PREPAID CARDS", filed Nov. 30, 2009 and U.S. patent application Ser. No. 12/134,149 entitled "METHOD AND SYSTEM FOR DELAYED PAYMENT OF PREPAID CARDS", filed Jun. 5, 2008, now U.S. Pat. No. 7,792,751 both of which are incorporated herein by reference.

BACKGROUND

A prepaid card includes a prepaid card identifier and is associated with a consideration for which the prepaid card can be redeemed. The consideration can be anything of value to a card recipient, such as products or services. Partial redemption is possible if the consideration can be prorated. For example, a prepaid card can be a retail store gift card with a dollar value, a prepaid cellular airtime card, or any other prepaid card that redeems for multiple products or instances of a service.

In one embodiment, a card purchaser purchases a prepaid card. The card purchaser can then provide the prepaid card to a card recipient, for example, as a gift. Such prepaid cards currently have annual US sales of $25 billion.

The card purchaser can purchase prepaid cards in bulk for distribution as gifts in promotional or marketing activities. Purchasing multiple prepaid cards in this manner can allow the card purchaser to obtain a volume discount from a prepaid card provider.

Such prepaid cards are distributed to card recipients as part of a promotion or marketing activity. Many prepaid cards can remain unused by the card recipients. This creates waste for the card purchaser in the unused prepaid cards or prepaid card balances. Further, paying the card purchase price does not benefit the card purchaser until the prepaid cards are redeemed by the card recipients, when the promotional or marketing benefits accrue.

Previously, a card purchaser pays for a prepaid card at the time of purchase, for example, with currency or a currency-equivalent. A card purchaser wishing to purchase one or more prepaid cards from a retail location, such as a store or an automated kiosk, receives the prepaid cards in exchange for payment. This is disadvantageous to the card purchaser if there will be delay between the purchase and the redemption of the prepaid card. The delay can tie up the card purchaser's liquidity and currency while providing no benefit to the card recipient until the prepaid card is redeemed.

Previously, retail stores receive prepaid cards from wholesalers for in-store placement and sale to card purchasers. In some instances, retail stores only pay the wholesalers for the prepaid cards when the prepaid cards are purchased by the card purchasers. This is advantageous to the retail store by minimizing inventory and carrying costs of the prepaid cards. However, as retail stores compete with each other to obtain better distribution arrangements with prepaid card providers, it would be advantageous to offer a more flexible payment system.

Thus, an improved method of charging the card purchaser for the prepaid cards is needed.

BRIEF DESCRIPTION OF DRAWINGS

FIG. 3C illustrates a procedure for crediting an unused prepaid card balance.
FIG. 4A illustrates an example data structure for storing prepaid card information.
FIG. 4B illustrates an example data entry for storing prepaid card information.

DETAILED DESCRIPTION

A prepaid card is sold to a card purchaser in exchange for a delayed payment, where the delayed payment is charged to a card purchaser account, for example, a checking account. If the prepaid card is not used within a predetermined amount of time, the delayed payment is credited back to the card purchaser account. A partial balance can be credited if the prepaid card was partially used. A service charge may be deducted from the credited delayed payment.

In one embodiment, the prepaid card is redeemed for a domain name registration. The purchaser or administrator can approve or deny domain name registration requests.

Figure 1:
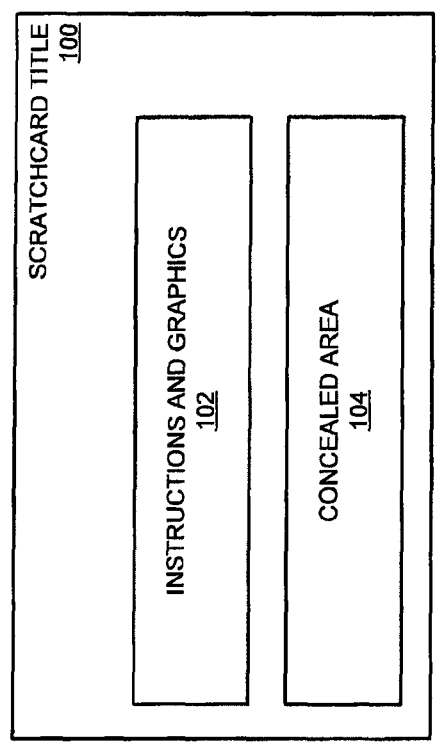
FIG. 1 illustrates an example prepaid card.

FIG. 1 illustrates an example prepaid card. For example, a prepaid card can be a scratchcard (also called a scratch off, scratch ticket, scratcher, scratchie, scratch-it, scratch game, or instant game) in the form of a card, usually made of cardboard or plastic. This facilitates user transportation of the scratch card by users and improves user familiarity and comfort.

The prepaid card can include a title 100 printed on its face. The title 100 can be text, graphics, or any other visual representation of information.

The prepaid card can also have instructions and graphics 102 printed or otherwise displayed on its face. The instructions and graphics 102 can be a combination of text and graphics. Additional text and graphics can be included on a backside of the prepaid card.

The prepaid card can include one or more concealed areas 104 that contain information. The concealed area 104 can be covered by an opaque substance such as latex that cannot be seen through, but can be scratched off or otherwise removed. Concealed information can include a prepaid card identifier.

Alternatively, the concealed area 104 can be covered with a peel-off strip configured to be easily removed by the user. The strip is opaque and cannot be seen through, but can be easily removed by the user to reveal the concealed information. Alternative coverings that are easily removed by the user can also be used.

The prepaid card can be individually packaged in a transparent material, such as plastic, to protect it from handling during shipping and sale and yet allow its printed surfaces to be visible to a user or purchaser. The prepaid card can be packaged together in groups of prepaid cards. In one example, prepaid cards of a same type are packaged together for sale. In another example, prepaid cards with complementary considerations are packaged together for sale.

Alternatively, the prepaid card can be any object configured to securely convey a prepaid card identifier to a gift recipient. For example, an email sent to the gift recipient's email address can contain the prepaid card identifier. An automated telephone call to a gift recipient's phone number can convey the prepaid card identifier to the gift recipient in audio format. Alternatively, the prepaid card identifier can be securely mailed to a gift recipient via regular post.

Figure 2:
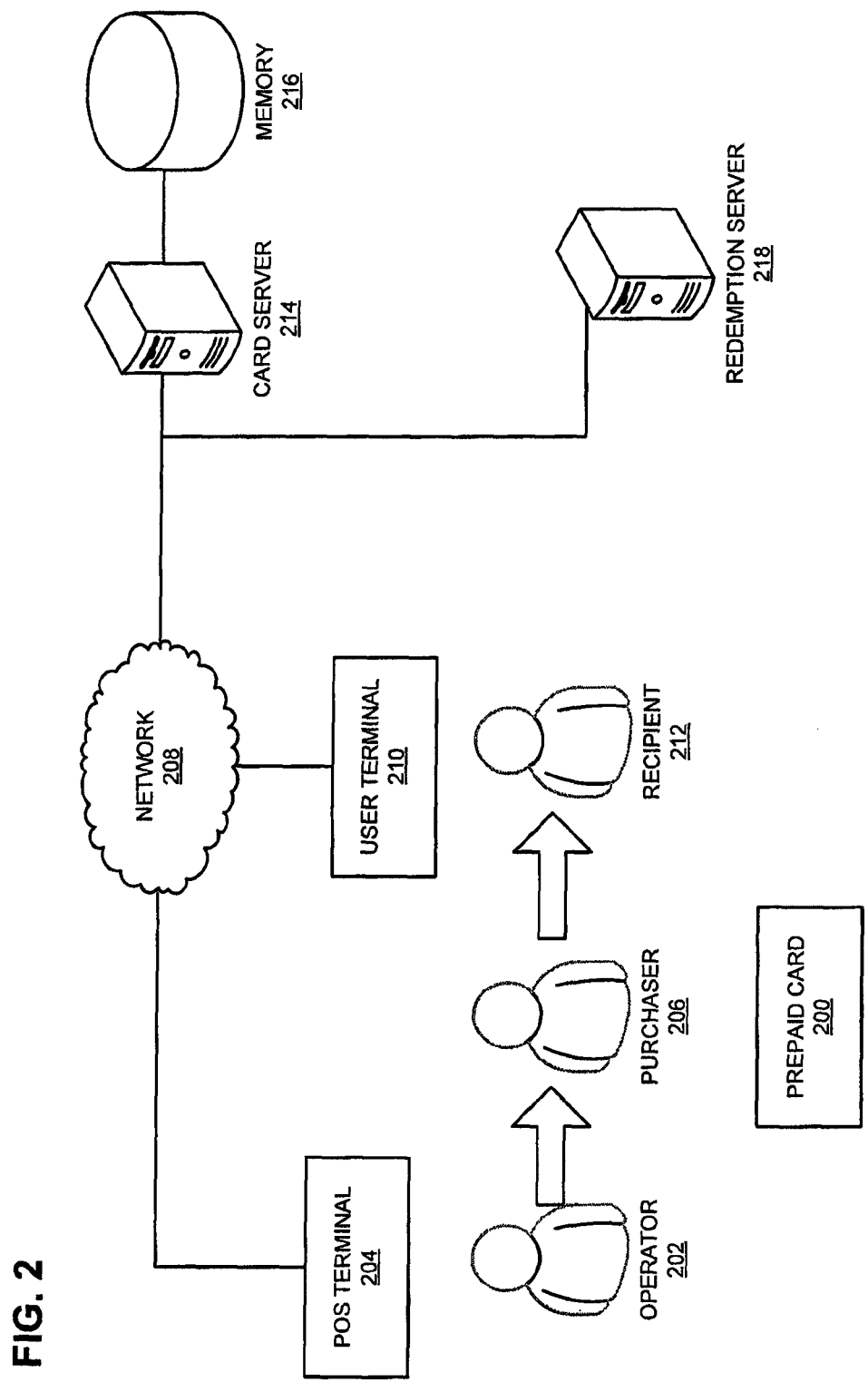
FIG. 2 illustrates an example system for providing delayed payment of prepaid cards.

FIG. 2 illustrates an example system for providing delayed payment of prepaid cards. The system sells a prepaid card 200 to a card purchaser 206 in exchange for a delayed payment. The delayed payment is not processed until a card recipient 212 has redeemed the prepaid card 200.

A prepaid card 200 can be sold by an operator 202 at a point of sales terminal 204 to a purchaser 206. For example, the prepaid card can be as illustrated in FIG. 1. The prepaid card 200 can be sold from a point of sales terminal 204 operated by the operator 202 at a retail location, such as a convenience store, a supermarket, or any other location configured to sell products or services to the purchaser 206.

In an alternative embodiment, the prepaid card 200 can be sold from an automated kiosk placed at a high-traffic location, such as a subway stop, a pedestrian walkway, or a similar location accessible to the purchaser 206. The automated kiosk does not require an operator 202. The automated kiosk can function as a point of sales terminal 204 within the system.

The purchaser 206 receives the prepaid card 200 in exchange for a delayed payment. For example, the delayed payment can be a credit card account that will not be charged until the prepaid card 200 is redeemed for its associated consideration. Alternatively, a debit card, an escrow account, a bank account, or any other form of currency capable of being processed at a later time can be used.

In an alternative example, the purchaser 206 can pay for the prepaid card 200 immediately, and a refund will be provided by the system at a later time. For example, a refund can be provided if the prepaid card 200 is not redeemed before a predetermined expiration date. This simplifies the payment processing by not requiring payment in a form that can be processed at a later time.

The point of sales terminal 204 is in communications with a network 208. The network 208 can be any network configured to carry digital information, such as the Internet, a private network, or any other network. Communications over the network 208 can be encrypted or otherwise secured to protect privacy and ensure security.

A recipient 212 can receive the prepaid card 200. For example, the recipient 212 can be the same person as the purchaser 206.

Alternatively, the recipient 212 can be a different person from the purchaser 206. In this example, the purchaser 206 purchased the prepaid card 200 as a gift for the recipient 212. Alternatively, the recipient 212 can be a target for a marketing or promotional activity conducted by the purchaser 206.

The recipient 212 can access a user terminal 210 in order to redeem the prepaid card 200. As discussed above, the prepaid card 200 can be redeemed for consideration, such as products or services. The terminal 210 can be in communications with the network 208.

In an alternative example, the recipient 212 takes the prepaid card 200 to a physical redemption center for redemption. For example, the prepaid card 200 can be redeemed for a physical service such as a car wash, laundry, or similar services that are most efficiently redeemed at a physical redemption center. The physical redemption center can include a user terminal 210 used to confirm the prepaid card 200's validity before redemption. The user terminal 210 at the physical redemption center can be used by an operator of the physical redemption center to interact with the servers, discussed below.

In an alternative example, the user terminal 210 is in communication with a different network from the point of sales network 204. The alternative network (not depicted) can be any network configured to carry digital information. Similar to the network 208, information transmitted over the alternative network can be encrypted or otherwise secured.

In an alternative example, if the prepaid card 200 is a multi-use card valid for a plurality of redemptions, a delayed payment can be processed for each redemption. This allows the payment by the purchaser 206 to be more closely tied to the consideration received by the recipient 212.

A card server 214 is in communications with the point of sales terminal 204 and the user terminal 210 over the network 208. The card server 214 maintains a list of prepaid cards in circulation and data associated with the prepaid cards.

The card server 214 receives an activation request from the point of sales terminal 204 at the time of sale of the prepaid card 200. A record in memory 216 representing the prepaid card 200 is updated to reflect its activation status, so that the prepaid card 200 can later be redeemed by the recipient 212. Activation of the prepaid card 200 at the time of sale can be a security function to prevent redeeming counterfeit prepaid cards or prepaid cards that were not paid for.

Similarly, the card server 214 receives a redemption request from the user terminal 210 at the time of redemption of the prepaid card 200. The card server 214 determines whether the prepaid card 200 is valid and activated before allowing redemption to proceed. The record representing the prepaid card 200 stored in memory 216 can be updated to reflect its redeemed status.

A prepaid card 200 can be invalid if it was not properly activated, its prepaid card identifier cannot be found by the card server 214, it has expired, or another reason. If the prepaid card 200 is valid, the redemption request is forwarded to a redemption server 218 for processing.

The card server 214 also processes the payment for the prepaid card 200 when the redemption request is forwarded. As discussed previously, the purchaser 206 provided a delayed payment that can be charged or collected at the time of redemption. Alternatively, the purchaser 206 can provide payment immediately at purchase and be entitled to a refund at a later time, as discussed above.

The memory 216 is accessible to the card server 214 and stores necessary data related to the sale and redemption of the prepaid card 200. For example, the memory 216 stores a data structure illustrated in FIGS. 4A and 4B representing the prepaid cards of the system.

A redemption server 218 can handle redemption of the prepaid card 200. A service can be redeemed by transmitting an authorization to a service provider authorizing the service provider to provide the requested service to the recipient 212. A product can be redeemed by initiating a fulfillment process that will ship the product to the recipient 212. Alternatively, a voucher can be transmitted to the user terminal 210 for printing by the recipient 212 for redemption at a physical redemption center.

In an example embodiment, the purchaser 206 can access an Internet web-based control panel to monitor a status of the prepaid card 200. The purchaser 206 can input identifying information regarding the recipient 212 via the web-based control panel or at the time of purchase of the card at the POS terminal 204. This facilitates the purchaser 206 from easily determining the status of each prepaid card 200 purchased and given as a gift.

Figure 3A:
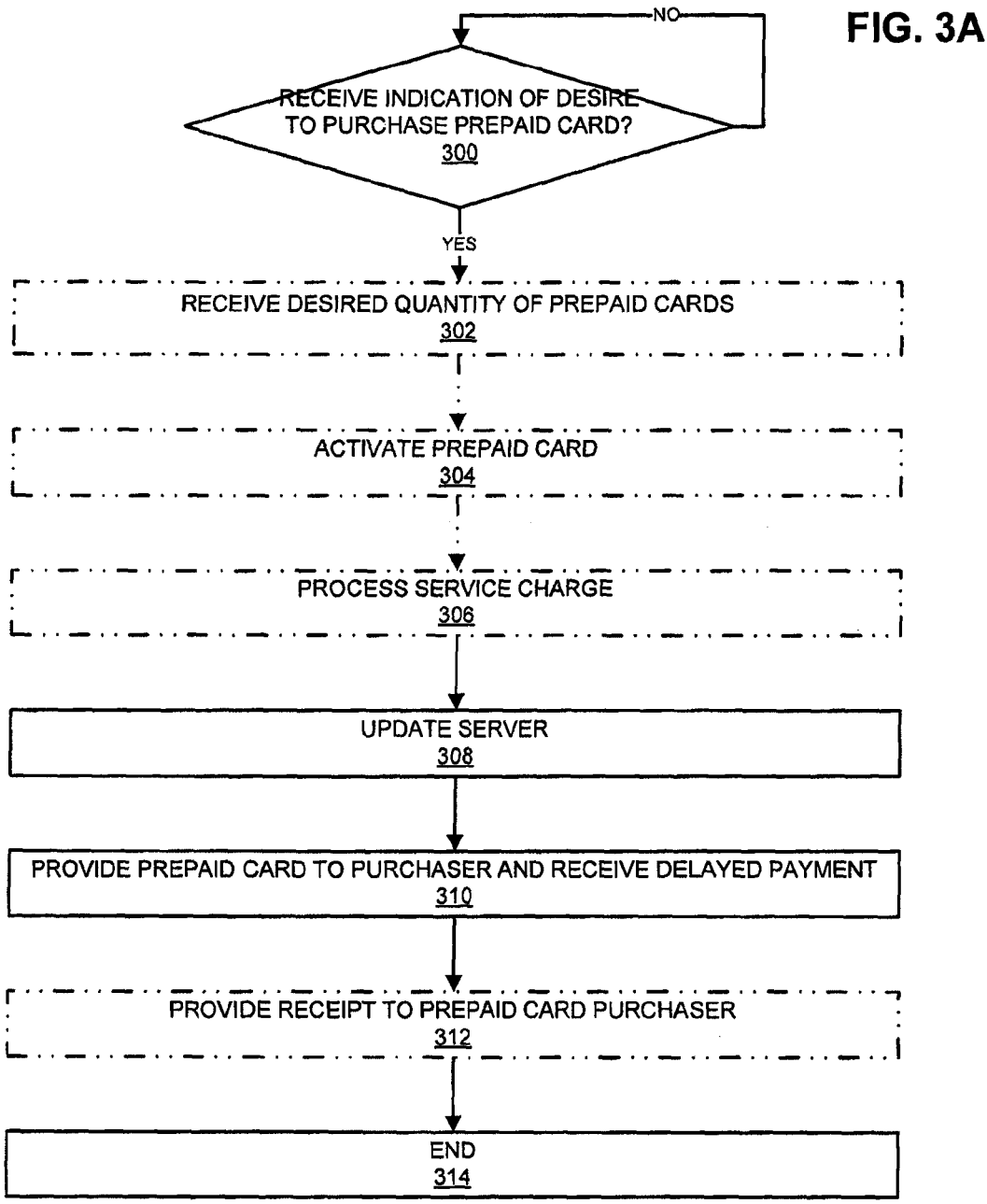
FIG. 3A illustrates a procedure for selling a delayed payment prepaid card.

FIG. 3A illustrates a procedure for selling a delayed payment prepaid card. A prepaid card is sold to a purchaser and is later redeemed by a recipient. The prepaid card can be sold by an operator at a point of sales terminal, from an automated kiosk, or from any other authorized seller of prepaid cards. For example, the procedure can execute on the point of sales terminal. A delayed payment made by the purchaser for the prepaid card is not processed until the prepaid card is redeemed.

In 300, the point of sales terminal determines whether an indication of a purchaser's desire to purchase a prepaid card is received. The operator of the point of sales terminal inputs a command initiating a prepaid card sales process responsive to a purchaser request to purchase a prepaid card.

Alternatively, the prepaid card can be displayed in a display area of a retail store accessible by the purchaser. The purchaser can take a prepaid card to the point of sales terminal for purchase.

If an indication is received, the point of sales terminal proceeds to 302. If no indication is received, the point of sales terminal waits at 300 for the indication.

In 302, the point of sales terminal optionally receives a desired quantity of prepaid cards to be purchased. For example, the operator can input the desired quantity of prepaid cards into the point of sales terminal responsive to a purchaser indication.

If the prepaid cards are taken by the purchaser to the point of sales terminal, the desired quantity of prepaid cards is equal to a number of prepaid cards brought to the point of sales terminal by the purchaser.

Alternatively, multiple prepaid cards can be packaged together for sale. This allows the purchaser to purchase a predetermined quantity of prepaid cards in one package.

In 304, the point of sales terminal optionally activates the prepaid card. Activating the prepaid card can include determining a prepaid card identifier and transmitting the prepaid card identifier to a server, where a record in a data structure representing the prepaid card is updated to reflect its activation status. The activation process can be a security measure, as discussed above.

In 306, the point of sales terminal optionally processes a service charge. The system can collect a service charge for the feature of delayed payment on the prepaid card. This service charge can be processed at the time of sale of the prepaid card. For example, the service charge can be a fixed fee or a percentage of a prepaid card value.

Alternatively, the service charge can be processed at a later time, for example, when the delayed payment is processed.

Alternatively, a service charge is not charged.

In 308, the point of sales terminal can update the server. The point of sales terminal can transmit a message to the server over a network indicating the prepaid card has been sold. The server can then track which prepaid cards have been sold and are awaiting redemption, and which prepaid cards remain on store shelves awaiting sale.

In 310, the point of sales terminal provides the purchased prepaid card to the purchaser. The operator of the point of sales terminal can physically hand over the purchased prepaid card to the purchaser.

The point of sales terminal also receives a delayed payment from the purchaser. As discussed above, the delayed payment can be any form of payment that can be processed at a later time when the prepaid card is redeemed.

In 312, the point of sales terminal optionally provides a receipt to the purchaser. The receipt can include a prepaid card description, the prepaid card identifier, a purchase price, a description of the delayed payment process, redemption options, and an expiration date, if applicable. The receipt can also include a machine-readable code representing the prepaid card identifier, for use in checking a status of the prepaid card, discussed below.

In 314, the point of sales terminal exits the procedure.

In an alternative embodiment, the prepaid card is sold from an automated kiosk. In this example, the purchaser indicates a selection and quantity of the desired prepaid card, and the kiosk dispenses the prepaid card after a delayed payment has been received.

Figure 3B:
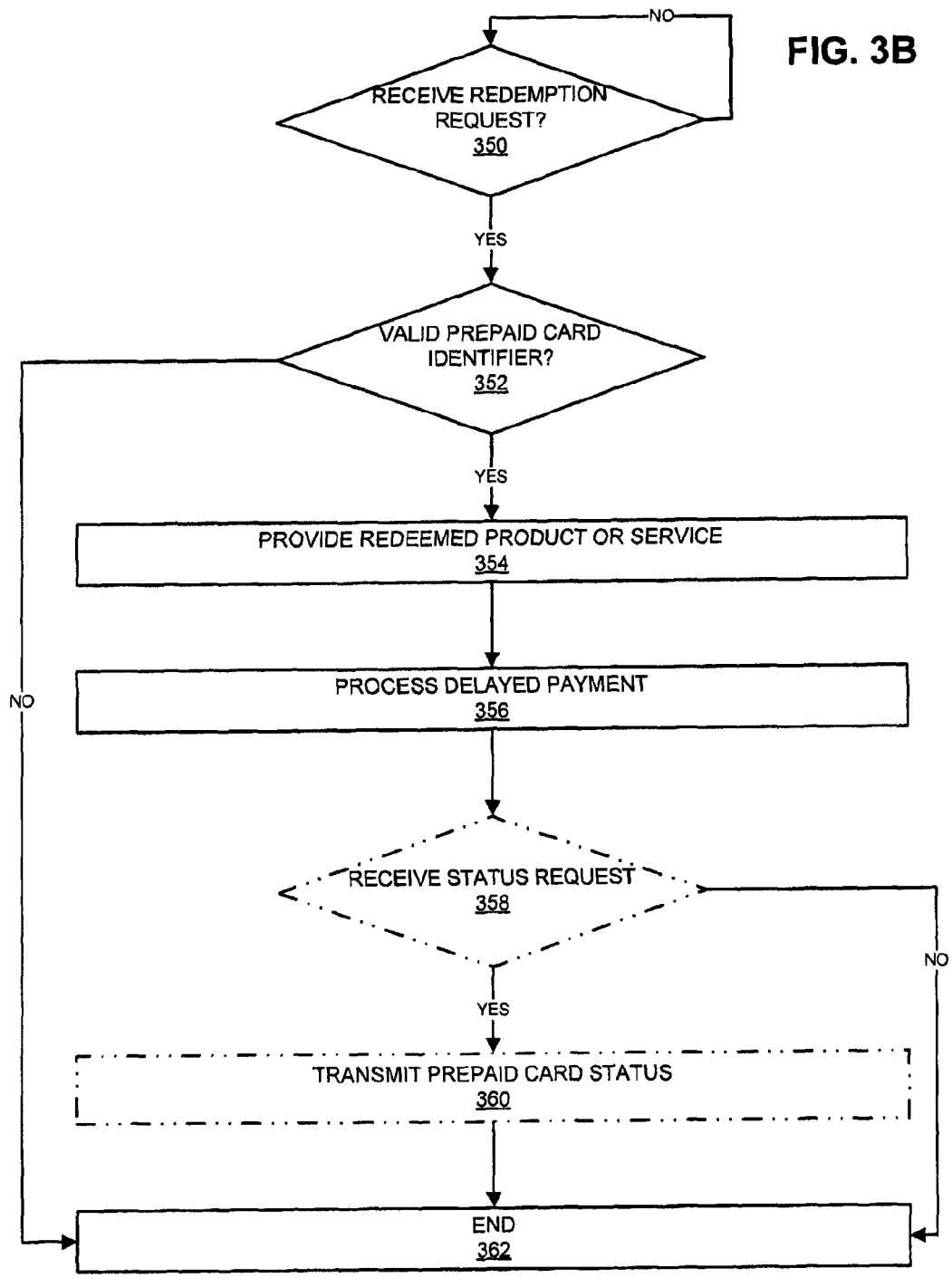
FIG. 3B illustrates a procedure for redeeming a delayed payment prepaid card.

FIG. 3B illustrates a procedure for redeeming a delayed payment prepaid card. A prepaid card is sold to a purchaser as illustrated in FIG. 3A. The prepaid card is redeemed by a recipient for a consideration at a user terminal in communication with a card server. For example, the recipient can be the same person as the purchaser, or a different person. The procedure can execute on the card server.

In 350, the card server determines whether a redemption request is received. For example, a recipient can access a user terminal that is configured to submit redemption requests to the card server. For example, a user terminal can be a computing accessible to the recipient, or a terminal at a physical redemption location.

If a redemption request is received, the card server proceeds to 352. If no redemption request is received, the card server waits for the redemption request at 350.

In 352, the card server determines whether the received prepaid card identifier is valid. The card server checks whether the received prepaid card identifier matches a set of valid prepaid card identifiers in memory. For example, prepaid card identifiers can be stored in a data structure as illustrated in FIGS. 4A and 4B. The card server can also check whether the prepaid card associated with the prepaid card identifier has been validly activated, has not expired, or otherwise ensure the prepaid card is valid.

If the prepaid card identifier is valid, the card server proceeds to 354. If the prepaid card identifier is not valid, the card server displays an error message and proceeds to 362, where the procedure exits.

In 354, the card server initiates a redemption procedure to provide the redeemed consideration to the recipient. For example, the card server can transmit an authorization to a redemption server that provides the consideration. If the prepaid card is redeemed for a physical good, the redemption server can initiate a fulfillment procedure to locate and ship an appropriate product to the recipient. If the physical good is to be redeemed at a physical redemption location, the redemption server authorizes the release of the physical good by the physical redemption location.

If the prepaid card is to be redeemed for a service, the redemption server transmits an authorization to a service provider to provide the service to the recipient. If the service is provided at a physical location, such as laundry service, the redemption server transmits an authorization to the service provider's location. If the service is provided online, the redemption server electronically transmits an authorization to an online service provider.

In 356, the card server processes a delayed payment for the prepaid card. The delayed payment is received previously when the prepaid card is purchased, discussed above. The card server processes the delayed payment, for example, by charging the associated credit card account the value of the prepaid card plus a service charge, if any. Alternative forms of delayed payments can also be processed.

It will be appreciated that the server can provide the redeemed consideration and process the delayed payment in any order, as long as they are executed substantially concurrently in time.

In 358, the card server optionally tests whether a status request is received. The card purchaser can submit a request to view a status and a prepaid card identifier. The prepaid card identifier identifies the prepaid card for which the status is requested.

The card purchaser can submit the request from a personal computer or an automated kiosk. For example, the status of a prepaid card can include whether it has been redeemed, whether the prepaid card has expired, or any other administrative information useful to the purchaser.

In one example, the receipt of prepaid card purchase includes the prepaid card identifier in a machine-readable format. The card purchaser simply scans the receipt at an automated kiosk to view the status of the prepaid card.

If a status request is received, the card server proceeds to 360. If no status request is received, the card server exits the procedure in 362.

In 360, the card server transmits a prepaid card status for display. Responsive to the status request received in 358, the card server retrieves the status of the prepaid card from memory. Prepaid card status can be stored in the data structure illustrated in FIGS. 4A and 4B.

The prepaid card status is then transmitted to the personal computer or kiosk used by the card purchaser to submit the status request.

In 362, the card server exits the procedure.

In one example, the user terminal is a computing device accessible to the recipient, and the redeemed product or service is delivered to the recipient. In another example, the user terminal is at a physical redemption center, where the recipient redeems the prepaid card. The user terminal can be any computing device from which the recipient redeems the prepaid card for the associated products or services.

FIG. 3C illustrates a procedure for crediting an unused prepaid card balance. The procedure can execute on a system as illustrated above. In 3000, a server tests whether a redemption request has been received from a card purchaser. If yes, the server proceeds to 3002. If no, the server remains at 3000.

In 3002, the system provides a prepaid card to the card purchaser. The prepaid card can be as discussed above. The prepaid card can be redeemable for a consideration by a card recipient. The consideration can be a product or service of value.

In 3004, the system can process the delayed payment. In one example embodiment, the delayed payment is processed immediately and a refund provided later, if necessary, as discussed below.

For example, a remaining balance on the prepaid card after an expiration of a predetermined time period can be refunded. The predetermined time period can be a validity period for the prepaid card, after which the prepaid card expires and cannot be redeemed.

For example, the delayed payment can be charged to a checking account or a credit card.

In 3006, the server tests whether the predetermined time period has expired. If yes, the server proceeds to 3008. If no, the server remains at 3006.

In 3008, the server can refund a remaining balance. For example, the remaining balance can be refunded to the account originally processed to charge the delayed payment.

In 3010, the server exits the procedure.

Figure 3D:
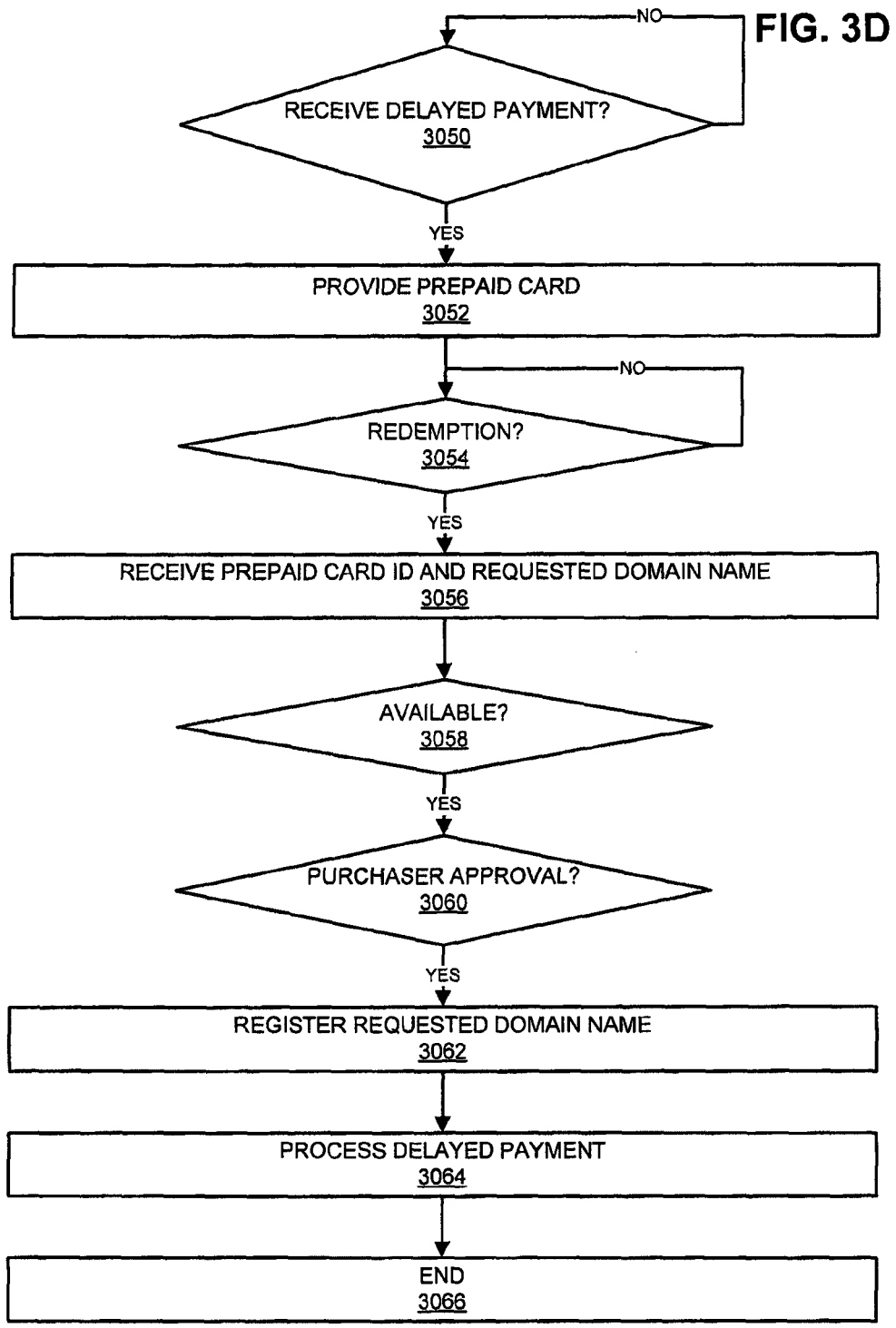
FIG. 3D illustrates a procedure for redeeming a prepaid card for a domain name.

FIG. 3D illustrates a procedure for redeeming a prepaid card for a domain name. The procedure can execute on a system as illustrated above. In 3050, a server can test whether a delayed payment has been received. If yes, the server proceeds to 3052. If no, the server remains at 3052.

In 3052, the system can provide a prepaid card to a card purchaser. The prepaid card can be as discussed above and redeemable for a domain name registration.

In 3054, the server tests whether an indication of redemption has been received associated with the prepaid card. The prepaid card can be redeemed by a card recipient, who can be the same person as the card purchaser, or a separate person receiving the prepaid card from the card purchaser. If yes, the server proceeds to 3056. If no, the server remains at 3054.

In 3056, the server can receive a prepaid card identifier and a requested domain name. The server can further receive domain registration information, such as owner and technical contact information.

In 3058, the server can test whether the requested domain name is available. If yes, the server proceeds to 3060. If no, the server can output an error message to the card recipient and request a new domain name.

In 3060, the server can test whether the card purchaser has approved the requested domain name. For example, the system can notify the card purchaser of a redemption request and the requested domain name, and provide the card purchaser with an opportunity to approve or deny the registration.

If the registration is approved, the server proceeds to 3062. If the registration is not approved, the server can output an error message to the card recipient and request a new domain name.

In 3062, the server registers the requested domain name. For example, the server can interface with a registrar or with ICANN to register the request domain name.

In 3064, the server processes the delayed payment received above. For example, the delayed payment can be a credit card, a debit card, a checking account, or another store of value which can be charged for the price of the prepaid card after redemption.

In 3066, the server exits the procedure.

FIG. 4A illustrates an example data structure for storing prepaid card information. Metadata associated with prepaid cards in a system as illustrated above can be stored in a data structure 400 on a storage medium accessible to a server. The data structure 400 includes a set of records 402, each record 402 representing a prepaid card and its associated data.

It will be appreciated that the data structure 400 can be stored in a variety of ways. For example, it can be stored as a tab delimited or comma delimited flat file, in a relational database, in a proprietary file format, or another storage method accessible to a server. Different storage formats will provide different advantages for different applications, as will be appreciated. The metadata data structure can be used for accounting, auditing, fraud-detection, tracking, or other purposes.

FIG. 4B illustrates an example data entry for storing prepaid card information. Each record 402 represent a prepaid card, as discussed above. Each record 402 can contain a variety of metadata, such as a prepaid card identifier 404 associated with the prepaid card. The prepaid card identifier 404 can be a unique alphanumeric sequence of characters and used to identify a prepaid card.

The record 402 can also include a description 406 that is a text description of the consideration associated with the prepaid card. This can be provided printed on a receipt after purchase of the prepaid card.

The record 402 can also include an activation field 408. As discussed above, a prepaid card can be activated at a point of sale when purchased by a user. Alternatively, other activation procedures can be used. For example, the activation process can be a security measure.

The record 402 can also include a date of sale 410. The date of sale 410 can store a date of sale of the prepaid card. For example, prepaid cards can have an expiry date calculated from the date of sale. If necessary, a sale time can also be stored if the time of sale during the day is important, for example, to track sales trends throughout the day.

The record 402 can also include a date of activation 412. The date of activation can record a date of activation of the prepaid card. For example, prepaid cards can have an expiration date calculated from the date of activation. Similar to the date of sale, a time of activation can also be stored.

The record 402 can also include a date of use 414. The date of use 414 can record one or more dates on which the prepaid card was used. For a one-use prepaid card, such as a one-use domain name registration prepaid card, there is only one date in date of use field 414. For multi-use prepaid cards, date of use field 414 will include a set of dates. Similar to the date of sale, a time of use can also be stored.

The record 402 can also include a remaining value 416. The remaining value 416 can record a remaining value left on the prepaid card. In one example, the prepaid card can be a one-use prepaid card, such as a one-use domain name registration prepaid card. In this example, the remaining value 416 decrements to zero after the first use.

In another example, the prepaid card can be a multi-use prepaid card. In this example, the remaining value 416 maintains a remaining value on the prepaid card.

It will be appreciated that any amount and type of metadata may be associated with each card for other purposes.

As discussed above, one example embodiment of the present invention can be a method for providing a prepaid card. The method includes, responsive to receiving a delayed payment at a purchase terminal, providing a prepaid card to a purchaser, the prepaid card redeemable for a consideration by a card recipient. The method includes processing the delayed payment. The method includes responsive to an expiration of a predetermined amount of time, determine if a balance remains on the prepaid card. The method includes refunding a remaining balance to the purchaser. The delayed payment can be processed by being charged to a checking account or a credit card. The consideration can be a product or a service. The delayed payment can include a value of the consideration and a service charge. Multiple prepaid cards can be packaged together for sale as gifts for gifting to multiple gift recipients. The method includes, responsive to receiving a purchaser request over a network, displaying a status of the prepaid card. The remaining balance can be a prorated portion of the delayed payment dependent on a number of redemptions of the prepaid card.

Another example embodiment of the present invention can be a method for registering a domain name. The method includes providing a prepaid card to a purchaser in exchange for a delayed payment, the prepaid card further provided to a card recipient and redeemable for a domain name registration. The method includes, responsive to an indication of redemption of the prepaid card by the card recipient, initiating a domain name registration process. The registration process includes receiving a prepaid card identifier and a requested domain name from the card recipient. The registration process includes verifying an availability of the requested domain name. The registration process includes receiving registration approval from the purchaser. The registration process includes registering the requested domain name. The method includes processing the delayed payment after the domain name has been registered. The registration process can further include receiving domain name registration information. The requested domain name and domain name registration information can be forwarded to a domain name registrar for registration. The method includes offering at least one of: a hosting service and a website design service to the card recipient after registering the requested domain name. Multiple prepaid cards can be packaged together for sale as gifts for gifting to multiple card recipients. The method includes, responsive to receiving a purchaser request over a network, displaying a status of the prepaid card. A portion of the delayed payment can be refunded to the purchaser if the prepaid card is not redeemed within a predetermined time.

Another example embodiment of the present invention can be a computer-readable medium including instructions adapted to execute a method for providing a prepaid card. The method includes, responsive to receiving a delayed payment at a purchase terminal, providing a prepaid card to a purchaser, the prepaid card redeemable for a consideration by a card recipient. The method includes processing the delayed payment. The method includes responsive to an expiration of a predetermined amount of time, determine if a balance remains on the prepaid card. The method includes refunding a remaining balance to the purchaser. The delayed payment can be processed by being charged to a checking account or a credit card. The consideration can be a product or a service. The delayed payment can include a value of the consideration and a service charge. Multiple prepaid cards can be packaged together for sale as gifts for gifting to multiple gift recipients. The method includes, responsive to receiving a purchaser request over a network, displaying a status of the prepaid card. The remaining balance can be a prorated portion of the delayed payment dependent on a number of redemptions of the prepaid card.

Another example embodiment of the present invention can be a computer-readable medium including instructions adapted to execute a method for registering a domain name. The method includes providing a prepaid card to a purchaser in exchange for a delayed payment, the prepaid card further provided to a card recipient and redeemable for a domain name registration. The method includes, responsive to an indication of redemption of the prepaid card by the card recipient, initiating a domain name registration process. The registration process includes receiving a prepaid card identifier and a requested domain name from the card recipient. The registration process includes verifying an availability of the requested domain name. The registration process includes receiving registration approval from the purchaser. The registration process includes registering the requested domain name. The method includes processing the delayed payment after the domain name has been registered. The registration process can further include receiving domain name registration information. The requested domain name and domain name registration information can be forwarded to a domain name registrar for registration. The method includes offering at least one of: a hosting service and a website design service to the card recipient after registering the requested domain name. Multiple prepaid cards can be packaged together for sale as gifts for gifting to multiple card recipients. The method includes, responsive to receiving a purchaser request over a network, displaying a status of the prepaid card. A portion of the delayed payment can be refunded to the purchaser if the prepaid card is not redeemed within a predetermined time.

It will be appreciated to those skilled in the art that the preceding examples and embodiments are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A method for providing a card suitable for multiuse redemption events, the method comprising:
    receiving payment information for a multiuse redemption card redeemable multiple times up to a defined monetary value;
    associating, using a processor, the payment information with the multiuse redemption card having the defined monetary value;
    activating, using the processor, the multiuse redemption card by determining an identifier associated with the multiuse redemption card and transmitting the identifier to a server where a data structure is updated to reflect the multiuse redemption card is activated;
    presenting the identifier to a purchaser to allow the purchaser to determine the status of the multiuse redemption card;
    receiving, from one or more point of sale terminals, a plurality of redemption requests associated with the multiuse redemption card having the defined monetary value, each specific redemption request corresponding to a specific monetary value;
    when the multiuse redemption card is active, for each specific redemption request of the plurality of redemption requests:
        at the time of the specific redemption request, processing a specific delayed payment using the payment information;
        wherein the specific delayed payment satisfies the specific monetary value of the specific redemption request, up to a remaining monetary balance on the multiuse redemption card;
        tracking, using the processor, each successful specific delayed payment to determine the remaining monetary balance; and
    deactivating, using the processor, the multiuse redemption card by updating the data structure when the remaining monetary balance is equal to or less than a zero monetary value.

2. The method of claim 1, wherein the payment information corresponds to a checking account or a credit card associated with a requestor making the request for the multiuse redemption card having the defined monetary value.

3. The method of claim 1, further including:
    when activating the multiuse redemption card having the defined monetary value, processing a service charge via the payment information.

4. The method of claim 1, further including:
    in conjunction with at least a first redemption request, processing a service charge via the payment information.

5. The method of claim 1, further comprising:
    receiving a request over a network to view the status of the multiuse redemption card; and
    displaying the status of the multiuse redemption card.

6. The method of claim 1, further including:
    setting one or more expiration conditions for the multiuse redemption card; and deactivating the multiuse redemption card when the one or more expiration conditions are met.

7. The method of claim 6, further including:
    refunding the remaining monetary balance, if any, upon deactivating the multiuse redemption card.

8. The method of claim 1, further including:
    receiving, through a web-based control panel, identifying information regarding a recipient of the multiuse redemption card to allow the purchaser to determine the status of the multiuse redemption card given as a gift to the recipient.

9. The method of claim 1, wherein presenting the identifier to the purchaser includes generating a machine-readable code representing the identifier.

10. The method of claim 1, wherein the identifier includes an alphanumeric sequence of characters.

11. The method of claim 1, wherein the data structure includes one or more of an identifier field, an activation field, a text description field, a data of sale field, a date of activation field, a date of use field, or a remaining value field.

* * * * *